United States Patent [19]

Pasternack

[11] 4,350,115

[45] Sep. 21, 1982

[54] WARNING SIGNAL DEVICE FOR RESPIRATORS

[75] Inventor: Adalbert Pasternack, Bad Schwartau, Fed. Rep. of Germany

[73] Assignee: Dragerwerk AG, Fed. Rep. of Germany

[21] Appl. No.: 225,657

[22] Filed: Jan. 16, 1981

[30] Foreign Application Priority Data

Feb. 8, 1980 [DE] Fed. Rep. of Germany ....... 3004594

[51] Int. Cl.[3] ............................................ G01L 19/12

[52] U.S. Cl. ................................ 116/70; 128/202.22; 137/557

[58] Field of Search ........... 116/70, 269, 266, DIG. 7, 116/112; 137/557; 128/202.22, 204.18

[56] References Cited

U.S. PATENT DOCUMENTS

| | | | |
|---|---|---|---|
| 3,611,981 | 10/1971 | Warncke | 137/557 |
| 3,785,333 | 1/1974 | Warncke | 137/557 |
| 4,064,899 | 12/1977 | Lehmann | 137/557 |
| 4,116,156 | 9/1978 | Draxler | 116/70 |
| 4,249,473 | 2/1981 | Pasternack | 116/70 |
| 4,275,723 | 6/1981 | Warncke | 116/70 |

FOREIGN PATENT DOCUMENTS

| | | | |
|---|---|---|---|
| 1952121 | 4/1971 | Fed. Rep. of Germany | 128/202.22 |
| 2029238 | 3/1980 | United Kingdom | 128/202.22 |

*Primary Examiner*—Anthony V. Ciarlante

*Assistant Examiner*—Denis E. Corr

*Attorney, Agent, or Firm*—McGlew and Tuttle

[57] ABSTRACT

A warning signal device for a respirator. An alarm device is connected to a precontrol chamber and is activated to sound or show an alarm when pressure rises in the precontrol chamber. A first valve member is movable and separates a high pressure gas supply chamber from a medium pressure chamber. A first valve seat is positioned between the medium pressure chamber and the precontrol chamber which is closed by the first valve member when gas pressure in the high pressure gas supply chamber is above a threshold value. A second valve member is movable between the precontrol and the control chambers. A second valve seat is positioned between the medium pressure chamber and the precontrol chamber and closable by the second valve member. A throttle passage is defined in the second valve member which, with the second valve seat open, communicates the precontrol and control chambers and, with the second valve seat closed, communicates the medium pressure chamber with the control chamber. A sealing pressure piston is movably mounted in the first valve member and abuts the second valve member to hold the second valve seat open when there is sufficiently high pressure in the high pressure gas supply chamber. With insufficient pressure in the high pressure gas supply chamber, the sealing pressure piston releases the second valve member which then closes the second valve seat.

7 Claims, 1 Drawing Figure

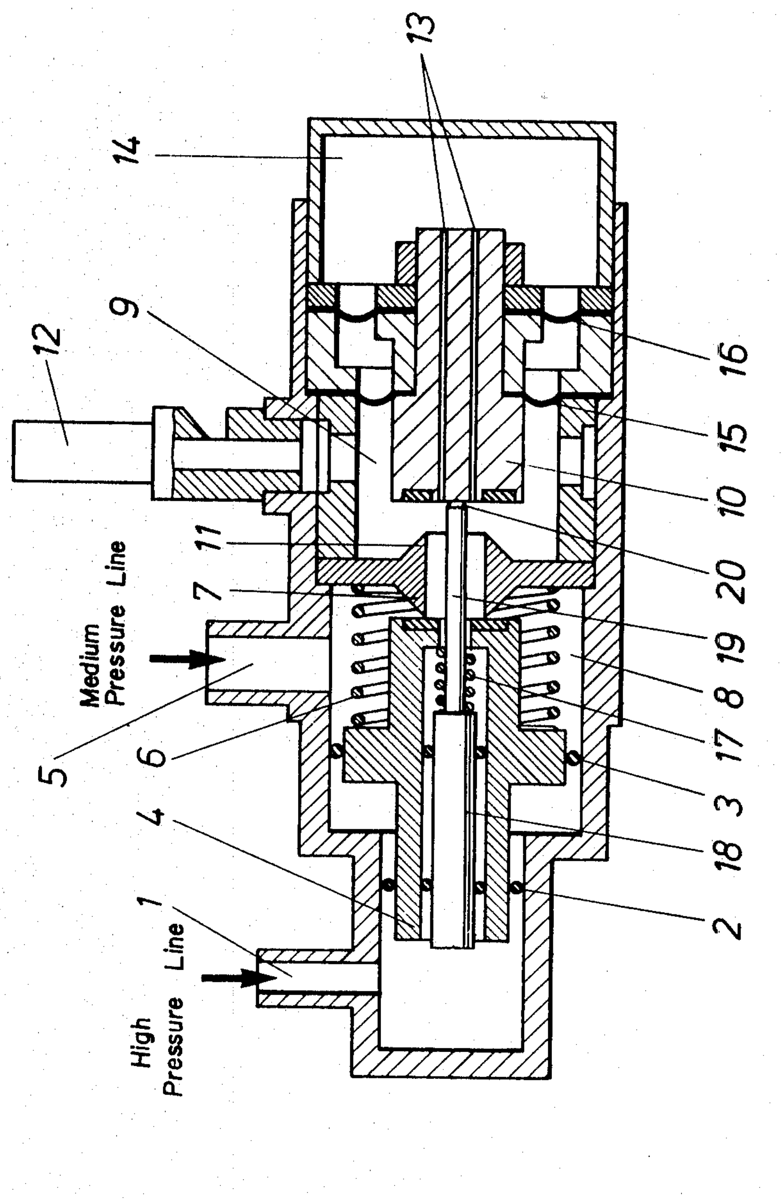
Medium Pressure Line
High Pressure Line
1
2
3
4
5
6
7
8
9
10
11
12
13
14
15
16
17
18
19
20

WARNING SIGNAL DEVICE FOR RESPIRATORS

FIELD AND BACKGROUND OF THE INVENTION

The present invention relates to warning signal devices for respirators having pressurized gas supplies.

The utilization time of respirators with a pressure gas supply is determined and, above all limited, by the gas reserve present in the pressure gas tanks, such as the gas bottles. These respirators, therefore, have alarm devices which warn the user of the respirator, in good time, when the gas reserve falls below a certain quantity. Operation of the alarm device occurs with utilization of the operating pressure of the gas. It must then be ascertained, however, that the alarm device fulfills its function at all times, regardless of handling, when the respirator is put into operation.

A known warning signal device for respirators with a pressure gas supply has, in front of the signal device, which is operated by the pressure gas, a pressure-controlled first valve which, in the line leading to the signal device, a pressure controlled second valve is arranged. The control means of the second valve is pressurized on one side by the pressure in the line leading to the signal device, while the other side defines a space closed on all sides which communicates with this line through a throttle.

After the opening of the first valve, after the pressure on the pressure gas supply has dropped, the pressure gas can flow directly to the signal device and set it into operation. The second valve closes after a time determined by the throttle, thereby, interrupting the inflow to the signal device. The alarm is thus ended automatically. After complete consumption of the pressure gas supply and, hence, dropping of the pressure, the valves of the warning signal device return to their starting position, i.e., both valves are open.

At normal initiation into operation of the respirator, after the opening of the shut-off valve of the pressure gas tank, a rapid pressure buildup occurs within the warning signal device. This closes the first valve. The quantity of gas flow up to this moment is insufficient for a closing of the second valve, but briefly sets the signal device in operation. This is taken as a control sign for operational readiness of the warning signal device. If the opening of the shut-off valve during the initiation of operation is defectively slow, the pressure buildup in the warning signal device is retarded. A longer time will then pass before the first valve closes.

During this time the second valve then also closes and remains closed, because with the first valve closed, the pressure in the control space of the second valve is maintained and cannot be relieved through the throttle. In this case, therefore, no alarm occurs as the pressure decreases in the pressure gas supply. (See German patent specification No. 21 29 529).

SUMMARY OF THE INVENTION

The object of the present invention is to provide a warning signal device for respirators which, under all circumstances, including a faulty slow opening of the pressure gas tank and correspondingly slow pressure increase in the system upon subsequent pressure drop, sets off an alarm when the pressure gas supply decreases.

Accordingly, an object of the present invention is to provide a warning signal device for a respirator, having a high pressure gas supply line for supplying high pressure gas, and a medium pressure gas line comprising, a housing defining a high pressure gas supply chamber to which the high pressure gas supply line is connected, a medium pressure chamber to which the medium pressure gas line is connected, a precontrol chamber and a control chamber.

An alarm device is connected to the precontrol chamber and is activatable to sound or show an alarm when the pressure in the precontrol chamber rises. A first valve member is movable in the housing and separates the high pressure chamber from the medium pressure chamber with a first valve seat defined between the medium pressure chamber and the precontrol chamber which is closed by the first valve member when the gas pressure in the high pressure gas chamber is above a threshold value.

A second valve member is movable in the housing between the precontrol and control chambers with a second valve seat between the medium pressure chamber and the precontrol chamber closable by the second valve member.

A throttle passage is defined in the second valve member which, with the second valve seat open, communicates the precontrol chamber with the control chamber and, with the second valve seat closed, communicates the medium pressure chamber with the control chamber. The first valve member includes a sealing piston slidably mounted therein and abutting the second valve member when gas pressure in the high pressure chamber is above the threshold value. When the pressure in the high pressure chamber falls to or below the threshold value, the sealing piston permits movement of the second valve member which causes the second valve member to close the second valve seat.

The movable sealing pressure piston inside of the first valve member or closing bolt of the first valve ensures, in a simple manner, both in function and in mechanical construction, that in any event, no matter within what time the pressure buildup takes place, the alarm occurs upon a later pressure drop. The wearer or user of the respirator is thus given added safety which can be of vital importance for such person or, if on a rescue mission, also for those to be rescued.

A further object of the present invention is to provide a warning signal device for respirators which is simple in design, rugged in construction and econimical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing presented is a sectional view of a warning device for respirators constructed in accordance with the present invention.

DESCRIPTION OF THE PREFERRED EMBODIMENT

Referring to the drawing in particular, the invention embodied therein, comprises, a housing which defines a series of chambers starting at the left with a high pressure gas supply chamber, a medium pressure gas chamber, a precontrol chamber and, finally, a control chamber. With pressure building to an alarm pressure in the precontrol chamber 9, an alarm 12 is sounded or shows an alarm indicating too low a supply of pressure from a high pressure supply line 1. The illustration shows the functional case where the gas tank pressure is greater than the alarm pressure. It is the state, therefore, in which the warning device is not yet triggered.

Pressure from high pressure line 1 acts over the surface of a closing bolt 4 sealed by the seals 2 and 3 against the medium pressure of line 5 and the force of a spring 6. As long as the pressing force from the high pressure line 1 is greater than the sum of the medium pressure force, plus the force from spring 6, closing bolt 4 presses against a first valve seat 7, which at this point forms a first valve, and it blocks the gas path from a medium pressure space 8 to a precontrol space 9. The gas path leads also through a second valve out of the control piston 10 and a second crater 11 forming the second valve. The precontrol space 9 has a gas connection to the alarm device 12. With a pressure buildup in space 9, alarm 12 is activated. The control piston 10 contains, via a throttle, in this case formed by bores 13, a flow path for the respiration gas to a control space 14. Control piston 10, forming a cross-wall with a membrane 15, is designed as an end wall at the end of the precontrol space 9, and with a larger membrane 16, delimits the control space 14 which is of a greater diameter. The control piston 10 is thus suspended for axial oscillation.

With an equal pressure buildup in the precontrol space 9 and, through the bores 13, in the control space 14, the control piston 10 will, due to the then resulting greater force on the larger membrane 16, move against the second valve seat 11, thereby, closing the second valve 10, 11. The closing bolt 4 contains a sealed pressure piston 18 which is displaceable axially against a compression sping 17. Piston 18 includes a projection 19, which can displace the control piston 10.

In normal operation, with a high pressure supplied by line 1, above the alarm pressure, (the low supply pressure at which alarm 12 should activate), the first valve is closed, with the pressure piston 18 keeping the second valve open by its projection 19 against the control piston 10. When the pressure from line 1 approaches the alarm pressure, that is, falls to the alarm pressure, then the pressure piston 18, moved by the compression spring 17, moves to the left with the end of its projection 19 to between the two seats 7 and 11. It thus no longer influences the movement of the control piston 10. With a further reduction of the pressure from line 1 below the alarm pressure, spring 6 pushes the closing bolt 4 to the left, which thereby opens the first valve 4, 7. The respiration gas now flows over the medium pressure line 5 at medium pressure, and into the precontrol space 9 and then to the alarm device 12, actuating the alarm. At the same time, the respiration gas flows through the throttle and the bores 13 into the control space 14. With the pressure buildup there, the control piston 10 moves against the second seat 11 and closes the second valve. The alarm is thereby ended.

Upon faulty opening of the high pressure tank, the pressure from line 1 flows in a smaller quantity. However, the fault of the known device, that is, that the second valve remains closed with the control piston 10 against the second seat 11 and alarm is then prevented also after decrease of the high pressure in line 1, could not occur with the present device. The pressure piston 18 will, in any event, push with is projection 19 against the control piston 10, holding the second valve open, so that the pressure can relieve the control space 14. Thus, in any event, an alarm will occur after a buildup of the high pressure in line 1.

While a specific embodiment of the invention has been shown and described in detail to illustrate the application of the principles of the invention, it will be understood that the invention may be embodied otherwise without departing from such principles.

What is claimed is:

1. A warning signal device for a respirator, having a high pressure gas supply line for high pressure gas supply, and a medium pressure gas supply line, comprising: a housing defining a high pressure gas supply chamber to which the high pressure gas supply line is connected, a medium pressure chamber to which the medium pressure gas line is connected, a precontrol chamber and a control chamber; alarm means connected to said precontrol chamber, activatable by an alarm pressure in said precontrol chamber; a first valve member movable in said housing separating said high pressure gas supply chamber from said medium pressure chamber; a first valve seat between said medium pressure chamber and said precontrol chamber closed by said first valve member when gas pressure in said high pressure gas supply chamber is above a threshold value; a second valve member movable in said housing between said precontrol and said control chambers; a second valve seat between said medium pressure chamber and said precontrol chamber closable by said second valve member; means defining a throttle passage between said precontrol and said control chambers when said second valve seat is open and between said medium pressure chamber and said control chamber when said second valve seat is closed; and a sealing pressure piston movably mounted with and with respect to said first valve member having a surface exposed to said high pressure gas supply chamber, and abutting said second valve member when gas pressure in said high pressure gas supply chamber is above the threshold value to hold said second valve seat open and, when the gas pressure in said high pressure gas supply chamber falls to the threshold value, permitting said second valve member to move to close said second valve seat.

2. A warning signal device for a respirator, as claimed in claim 1, including a spring biasing said first valve member away from said first valve seat, said first valve member closing said first valve seat under the influence of sufficient pressure in said high pressure gas supply chamber.

3. A warning signal device for a respirator, as claimed in claim 2, including a spring connected between said sealing pressure piston and said first valve member for biasing said sealing pressure piston against the action of pressure in said high pressure gas supply chamber.

4. A warning signal device for a respirator, as claimed in claim 3, wherein said first valve member, said second valve member and said sealing pressure piston are axially movable on a common axis.

5. A warning signal device for a respirator, as claimed in claim 1, wherein said means defining a throttle passage comprise said second valve member including at least one throttle passage defined therethrough between said second valve seat and said control space.

6. A warning signal device for a respirator, as claimed in claim 5, wherein said second valve member includes a first membrane facing said precontrol chamber and a second membrane facing said control chamber, said second membrane having a larger surface area than said first membrane to urge said second valve member against said second valve seat with equal pressures in said precontrol and control chambers.

7. A warning signal device for a respirator, as claimed in claim 1, including a wall between said medium pressure chamber and said precontrol chamber, said first and second valve seats defined on opposite sides of said wall at the end of the single passage defined in said wall.

* * * * *